United States Patent [19]

Gaddi

[11] Patent Number: 4,589,858
[45] Date of Patent: May 20, 1986

[54] VARIABLE RATIO TRANSMISSION SYSTEM, PARTICULARLY USEFUL FOR VEHICLES

[75] Inventor: Bruno Gaddi, Pisa, Italy

[73] Assignee: Piaggio & C. S.p.A., Genoa, Italy

[21] Appl. No.: 586,682

[22] Filed: Mar. 6, 1984

[30] Foreign Application Priority Data

Sep. 9, 1983 [IT] Italy ............................. 22839 A/83

[51] Int. Cl.⁴ .......................................... F16H 11/06
[52] U.S. Cl. ...................................... 474/12; 474/13; 474/14; 474/28
[58] Field of Search ...................... 474/12, 11, 13, 14, 474/16, 28; 74/857

[56] References Cited

U.S. PATENT DOCUMENTS

| 2,173,661 | 9/1939 | Perrine | 474/12 X |
| 3,600,961 | 8/1971 | Rattunde | 474/12 X |
| 4,228,691 | 10/1980 | Smirl | 474/12 |

Primary Examiner—James A. Leppink
Assistant Examiner—Frank McKenzie
Attorney, Agent, or Firm—Hedman, Gibson, Costigan & Hoare

[57] ABSTRACT

This invention relates to a variable ratio transmission system suitable for vehicles in which the speed regulator is mounted on the transmission driven shaft, and the relationship governing its response to the speed variation of the driven shaft is such as to induce a transmission ratio variation to predetermine the speed of the system input shaft, which is intended for connection to the drive shaft. Means are also provided for connection to engine regulator means, in order to determine the constant speed of the system input shaft as a function of the torque applied to the transmission input shaft.

10 Claims, 8 Drawing Figures

VARIABLE RATIO TRANSMISSION SYSTEM, PARTICULARLY USEFUL FOR VEHICLES

In vehicles comprising internal combustion engines it is known to use change-speed gears of automatically variable transmission ratio, in particular variators of the V-belt and expandable, i.e. variable diameter pulley type.

The transmission ratio variators of this type are widely known and used in many fields, including in vehicles such as mopeds, motorcycles and motor vehicles, and their general structure does not require description.

In their application to vehicles, the main problem consists of providing a control system for varying the ratio such as to maintain this latter within the best values for rational utilisation of the engine power at the various speed openings.

This requires the control system for varying the ratio to be governed by both the factors determined by the power, namely the engine rotational speed and the transmitted torque, this latter being determined directly or indirectly, such as by the opening of the throttle control.

Most of the common variators intended for light vehicles are not influenced by the torque, whereas others comprise mechanical devices which allow only partial correction of the main centrifugal control, and still others use servo-mechanisms with good practical results, but resulting in considerable constructional complications.

The method according to the invention relates to this latter type of solution, i.e. comprising a servo-mechanism, and in this context is intended to simultaneously resolve the following problems:

(a) To provide a control system for the servo-mechanism with characteristics such as to obtain, for constant engine feed, a variation in the transmission ratio while the drive shaft speed follows a predetermined pattern or, in particular, remains constant. In this respect, it is theoretically desirable for such a gear system to enable the engine to rapidly attain a rotational speed considered optimum, and then, under constant regulation of the engine feed, to continuously vary the transmission ratio as the vehicle speed varies under the acceleration permitted by the torque available at the shaft, so as to maintain the engine rotational speed practically constant.

(b) To provide a control system for the servo-mechanism by which it is possible to act on it directly, with a very low force, by means of the throttle control, and in particular by means of a throttle control of the knob type as used on motorcycles.

The object defined under (a) might induce the designer to design a speed variator in which the regulator device was located on the engine, or at least upstream of the transmission, and such that the transmission ratio variation occurred with substantially negligible changes in the angular speed of the engine.

Such a solution is not satisfactory in practical terms, in that the resultant system has a degree of stability which is not very high, and the inevitable inertia and friction lead to unacceptable fluctuations in the transmission ratio. The fluctuations persist even if the sizing is related to a non-constant pattern of engine r.p.m. (within practically acceptable limits).

The object described under (b) considerably increases the aforesaid difficulties, in that the low power of the device emphasises the influence of internal friction.

The applicant has now developed a different solution of the problem, which appears completely satisfactory and is based on a different structure of the entire belt variator regulating system.

To better understand the basic principle of the invention, it should be noted that the applicant has taken into consideration the fact that the relative position of the faces of the driven pulley constitutes a position signal which is uniquely related to the actual transmission ratio.

It is also possible to provide a sensor for the angular speed of a pulley shaft, which controls the position of opening of the pulley mounted on said shaft or of the other pulley in a unique manner so that a certain degree of opening of the pulley corresponds to each speed, if excessive sensitivity is not required of the centrifugal device, as heretofore discussed.

Finally, it is possible to provide a centrifugal or functionally equivalent device which reacts to its own rotational speed with any required governing relationship, i.e. by varying its response as a function of the position assumed by virtue of its own speed.

The specified objects are attained according to the invention by providing, in a transmission system of continuously variable transmission ratio between a drive shaft and a driven shaft, a device for controlling the position of an operating element arranged to vary said ratio, characterised by comprising means sensitive to the speed of the driven shaft in order to move said operating element into a position which uniquely determines the value of the transmission ratio in accordance with a governing relationship which is predetermined in such a manner as to respond to each speed variation with a width of movement which increases as the speed increases, said governing relationship providing for each position assumed by said sensitive means a position of the operating element such as to effect a transmission ratio which maintains the rotational speed of said drive shaft substantially constant, means sensitive to the torque transmitted to said drive shaft controlling a yieldable member acting on said means sensitive to the speed of the driven shaft in order to vary said governing relationship in the sense of varying the rotational speed value at which the drive shaft is maintained substantially constant as the transmission ratio varies.

The manner of acting on the variable transmission system according to the invention, and the general method of this latter, will be more apparent from the description given hereinafter of practical embodiments of said invention illustrated on the accompanying drawings in which:

FIG. 1 shows a variable ratio transmission with an input shaft 9 and an output shaft 11, which in a vehicle, not shown, would be connected respectively to the engine and to the wheels by suitable linkages.

Figure 1:
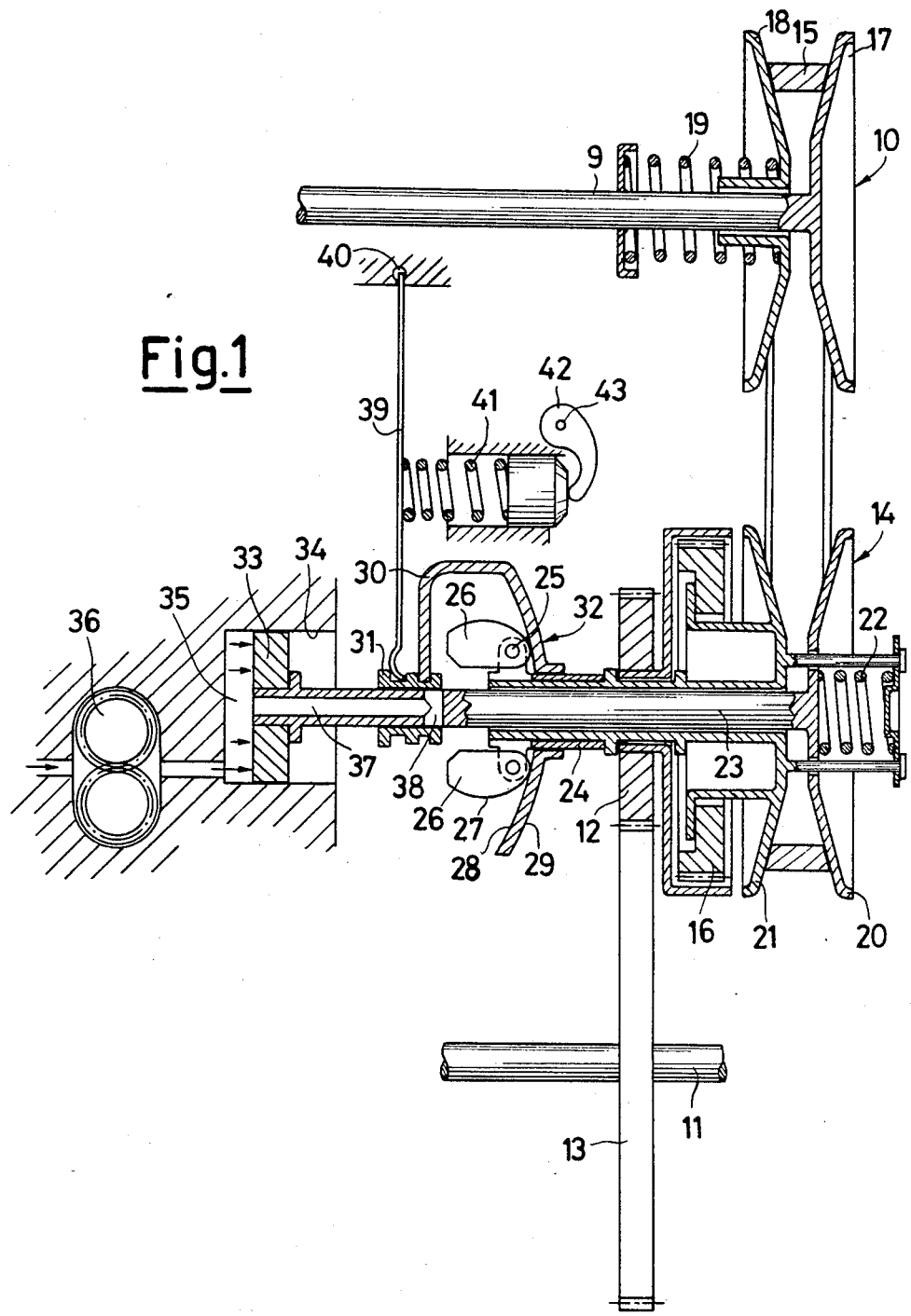
FIG. 1 is an overall diagram of a transmission system according to the invention.

The shaft 11 receives motion by way of a reduction gear train 12, 13 from the expandable driven pulley 14 which is driven by the belt 15 from the analogous drive pulley 10 mounted on the shaft 9, and by way of a centrifugal clutch of known type, indicated diagrammatically by 16.

The pulley 10 is formed from two half pulleys 17 and 18 urged together by the spring 19, and similarly the half pulleys 20 and 21 of the pulley 14 are urged together by the spring 22. This latter is of more energetic action than the spring 19, so that in the absence of external control, the transmission has its pulley 10 open and pulley 14 closed, to determine the highest ratio between their rotational speeds. The half pulleys 17 and 21 are fixed while the half pulleys 18 and 20 are moveable in response to springs 19 and 22, respectively.

The half pulleys 20 and 21 extend into a shank 23 and sleeve 24 respectively. On the sleeve 24 there is mounted a speed sensor indicated overall by 32, comprising centrifugal masses 26 which are pivoted at 25 and engage by way of their rear surface 27 with the inner surface 28 of the cap 29 slidably mounted on said sleeve.

The cap 29, by way of its extension 30, controls a hydraulic follower servo-mechanism constituted by a bush 31 which slides on the shank 23, to the end of which there is connected the piston 33 which defines in the seat 34 a chamber 35 into which a pump shown diagrammatically at 36 delivers.

A passage 37 traverses the piston 33 and shank 23 to emerge radially in the form of ports 38.

The action of the cap 29 against the bush 31 is opposed by a lever 39 pivoted at 40 and urged by a spring 41 which is pre-loadable in a determined manner by a control finger 42 pivoted at 43.

It is generally apparent that as the rotational speed of the centrifugal device 32 increases, the masses move the cap 29 towards the right of the drawing, so that it moves the bush 31 in the same direction against the action of the spring 41, to close the port 38. This causes the pressure in the chamber 35 to rise, and the piston moves towards the right of the drawing in order to displace the shank 23 until the port 38 becomes uncovered by the amount necessary to re-establish equilibrium between the thrust which the piston receives from the pressure in the chamber 35 and the thrust which it receives from the spring 22 and belt by way of the shank 23.

Thus in practice the fluid pumped into the chamber 35 provides energy for compelling the piston 33 and thus the shank 23 to maintain a predetermined position relative to the bush 31 and thus relative to the cap 29. Thus for each position of the cap 29, which represents the mobile member of the speed sensor 32, the half pulley 20, which represents the transmission operating element, assumes a unique position, i.e. a determined transmission ratio is attained between the pulleys 10 and 14.

The necessary relationship governing the action of the centrifugal masses 26 for attaining the objects of the invention will now be discussed.

The movement which the cap 29 undergoes by virtue of the action of the centrifugal force to which the masses 26 are subjected derives from the configuration of the contact surfaces 27, 28 and the characteristic of the opposition spring 41. The forces on the system which derive from the action of the springs 22 and 19 are compensated by the pressure of the liquid fed into the chamber 35.

With the configuration of the surfaces 27 and 28 illustrated in FIG. 1, it is apparent for example that as the degree of opening of the masses increases, the distance of the point of contact between said surfaces from the axis of rotation of the centrifugal sensor 32 varies, and thus the thrust on the cap increases less than would be the case by virtue of the mere speed change, i.e. the regulator becomes less sensitive.

If S is the displacement of the half pulley 20 from its position of maximum approach to the half pulley 21, and $\omega$ its angular speed at constant speed of the pulley 10, it is possible to draw a diagram of $\omega$ against S in which the different curves a, b, c relate to three different speeds $\omega_a$, $\omega_b$, $\omega_c$, of the pulley 10. This diagram is shown entirely indicatively in FIG. 2.

It will be assumed that the system is in equilibrium at point A ($\omega_1$, $S_1$), and the pulley 14 is then subjected to a load which causes it to assume a lower speed ($\omega_2$). The relationship governing the regulator 32 must be predetermined such that the speed $\omega_2$ results in a corresponding position of the cap 29 such as to impose the position $S_2$ on the half pulley 20. In this manner the rotational speed of the pulley 10 tends to remain constant, thus attaining the object of the invention.

As a wide speed variation ($\omega_2-\omega_1$) is available for inducing the displacement ($S_2-S_1$), it is possible to obtain a substantial constancy in the drive shaft speed by means of a relatively insensitive and thus very stable speed sensor device 32 mounted on the driven shaft.

If the required drive shaft speed pattern is that of constant speed, the curves a, b and c of FIG. 2 form portions of an exponential curve as demonstrated hereinafter.

The sizing of the entire rotational speed regulating apparatus presents no difficulty to the expert of this art.

The characteristics of the surfaces 27 and 28 and the spring 41 must be such that on interaction they produce the aforesaid predetermined result.

The aforesaid effect with reference to the curve a can also be obtained for the other curves of which b and c are examples of the infinite family, by differently preloading the spring 41 by moving the finger 42.

By thus associating the movement of the finger 42 with a sensor for sensing the torque provided by the engine, such as with the feed regulator control, it is possible to impose on the pulley 10 and thus on the engine any predetermined speed by the automatic variation of the transmission ratio.

The intrinsic stability of the speed sensor positioned as stated means that its size can be such that the force required to operate the finger 42 is very small, and this latter can thus be connected directly to the throttle control, even when this is of the knob type.

With the variator configuration of the type proposed by the invention, the engine speed can thus be maintained at a predetermined value as the transmission ratio is automatically varied in order to obtain this effect.

Obviously, the choice of constant engine speed is only one particular case obtainable by means of the invention. It can also be considered convenient for the engine speed to vary within acceptable limits over the range of variation of the transmission ratio, for example 1000+2000 r.p.m., i.e. 15–30%.

However, even variations of this order in the drive shaft speed would not allow the control of a variator having an element sensitive to the rotational speed at a speed value equal or proportional to that of the drive shaft itself, without instability phenomena arising.

Thus in this description, the expression "substantially constant r.p.m." means an engine speed which deviates from a constant speed by up to for example 30%.

It is apparent that the speed sensor constructed according to the invention and shown by way of example on the drawing with the reference numeral 32 is, according to the invention, subject to speed variations which are greater in terms of order of magnitude, so that it can have a sensitivity which is sufficiently low as to exclude any instability phenomenon, while maintaining the engine r.p.m. substantially constant in the aforesaid sense.

Figure 3:
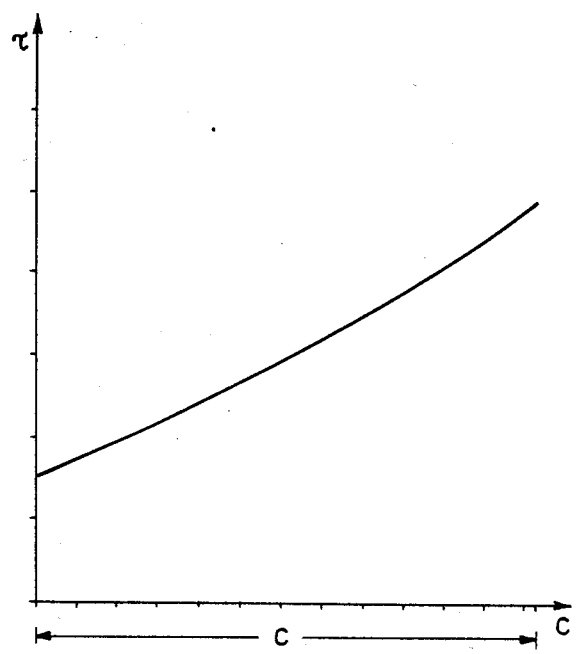

In order to better identify how the pre-loading of the spring 41 has to be regulated in order to maintain the engine r.p.m. constant under different running states under the control of the engine feed regulation, the following diagrams will be considered: FIG. 3 shows in graphical form the supposed variation in the transmission ratio $\tau$ as the stroke c of the half pulley 20 varies from its rest position. In the case under examination, this stroke c is equal to the stroke of the cap 29.

Generally the ratio R, i.e. $\tau_2/\tau_1$ between the transmission ratios obtainable in practice and thus between the maximum and minimum speeds of the driven pulley for equal engine speeds is about 3. The ratio of the centrifugal forces applied to the masses 26 of the regulator for the extreme values of the ratio $\tau$ is thus equal to $R^2$ (in that the centrifugal forces are proportional to the square of the angular speed) multiplied by the ratio of the corresponding values of the barycentric radius $r$ of the masses 26, which during the ratio variation move outwards.

This ratio is therefore of the order of 10, i.e. very high. On the other hand, as the extreme values of the engine speed used in practice are in a ratio of about 3, then the ratio of the centrifugal forces corresponding to the maximum and minimum vehicle speeds can reach values of the order of 90–100.

Figure 4:
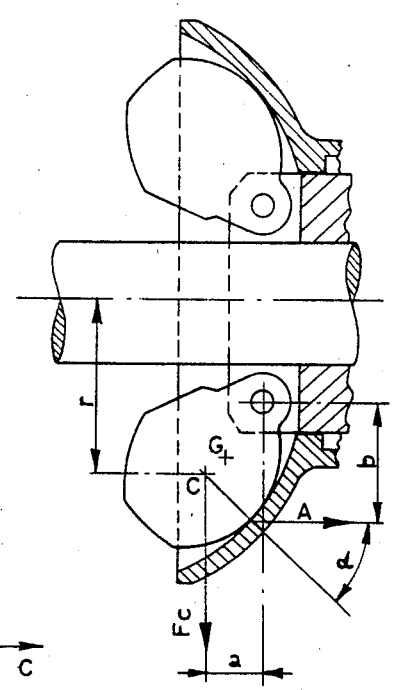
FIG. 4 is an enlarged detail of FIG. 1.
Figure 5:
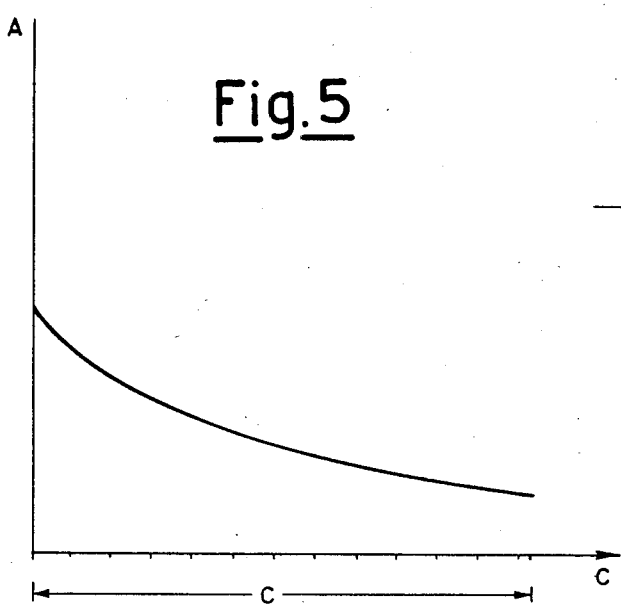
FIGS. 5, 6 and 7 are further operational diagrams of the device.

The action of the centrifugal forces must be balanced by the reaction of the spring 41 applied to the regulator collar 31, and thus in order to prevent excessive variation of said reaction and obtain a suitable reaction pattern, it is advantageous as stated to reduce the variation in the thrust on the regulator collar due, for equal engine speeds, to the variation in the transmission speed ratio, by using a suitable mechanism for transmitting the action of the centrifugal forces. In the case of the type of centrifugal regulator shown in FIG. 1, and shown to a larger scale in FIG. 4, the ratio $\epsilon$ of the thrust A to the centrifugal force $F_c$ of the regulator transmission mechanism as a function of the stroke c is equal to the ratio of the lever arm a of the centrifugal forces to the lever arm $b/\cos \alpha$ of the axial components of the contact reactions between the masses 26 and the cap 29 about the pin 25. The variation in the axial thrust A on the regulator collar as a function of the relative stroke corresponding to unit angular speed of the regulator shaft, obtained by multiplying said variable ratio $\epsilon$ by the variable barycentric radius r of the masses, is shown indicatively on the diagram of FIG. 5.

Figure 6:
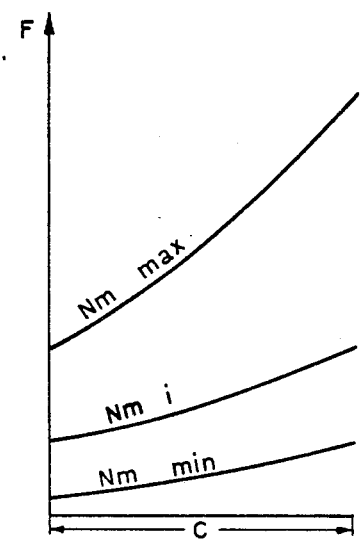

Finally, FIG. 6 shows the variation of the axial thrusts F on the regulator collar as a function of the relative stroke c, obtained by multiplying the unit thrusts A of the preceding diagram by the square of the transmission ratios $\tau$ shown in FIG. 3, and by the square of the angular speed corresponding to the engine r.p.m., Nm, assumed as parameter. The ratio of the thrusts, and thus of the spring reactions at the ends of the stroke, is equal for all engine speeds, and can be reduced to values very close to unity, as shown by the diagram of FIG. 6. On the other hand, for each engine speed, there can be made to correspond a predetermined value of the drive torque and of the throttle opening, and thus of the pre-loading of the regulator spring. The characteristic of such a spring which gives a constant ratio between the reactions at the ends of one and the same increment in its stroke for any value of its pre-loading stroke is an exponential function of type $Sx = a^x$.

Such a spring can for example be in the form of a metal wire wound as a cylindrical variable pitch helix, or alternatively conical, but can also be of rubber or of gas-filled or other type, but is always relatively easy to construct. By virtue of the exponential characteristic, the stroke, including the pre-loading stroke and the stroke of the collar, and thus the length of the spring is very limited, and because the extent of the required reaction is very small due to the fact that the collar does not have to overcome any particular resistance, the spring dimensions are also small. The consequence of this is that the vehicle driver does not have to exert considerable force on the throttle knob.

Figure 7:
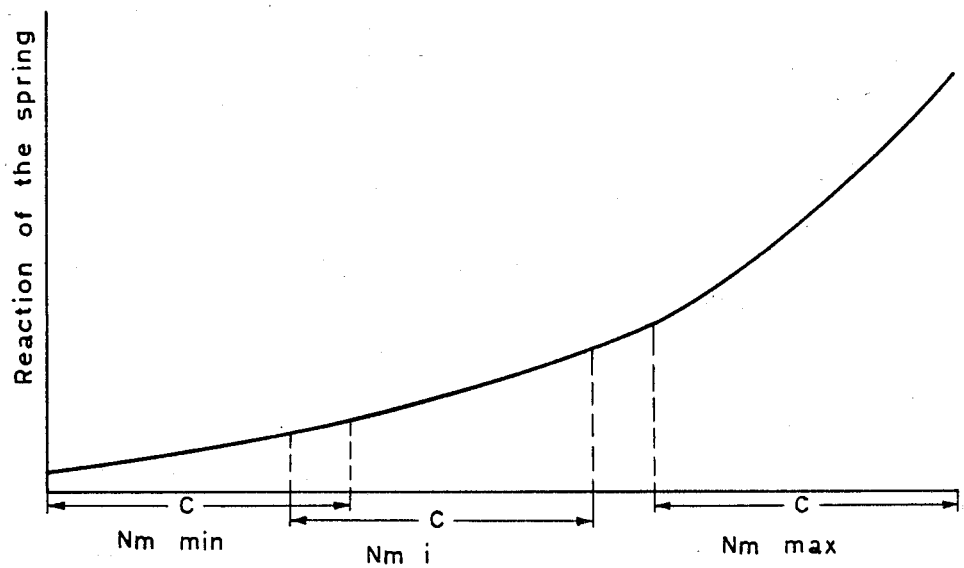

FIG. 7 shows the exponential characteristic of the regulator reaction spring 41, showing certain portions of the stroke c used during the ratio variation at constant engine r.p.m. represented by minimum Nm, intermediate Nm and maximum Nm.

Obviously if regulation at rigorously constant engine speed is required, the thrust on the collar deriving from the speed of the shaft 23 must also vary exponentially during the ratio variation.

Even this can be easily obtained by adjusting the shape of the profile 27 of the centrifugal cams 26 which makes contact with the circular arc cap surface 28 of the collar 29, this profile then being only slightly different from a circular arc.

For simplicity of description it has been heretofore assumed that the regulator travel causes a corresponding variation in the opening and thus in the race diameter of the driven pulley 14.

It is however apparent to the expert that this does not necessarily imply that the control system operates directly on the driven pulley, as it could alternatively operate on the drive pulley because of the fact that it is the relative position of the pulleys which is uniquely determined by the presence of the inextensible connection belt.

Figure 2:
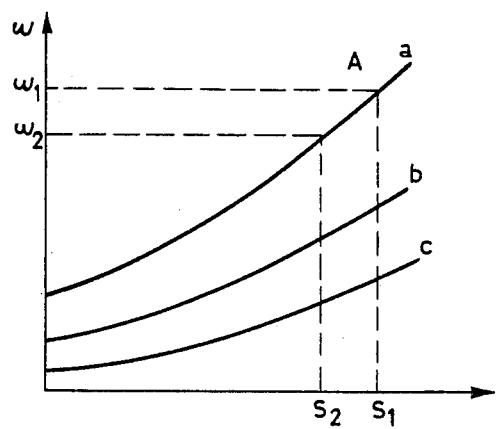
FIGS. 2 and 3 are operational diagrams of the device of FIG. 1.
Figure 8:
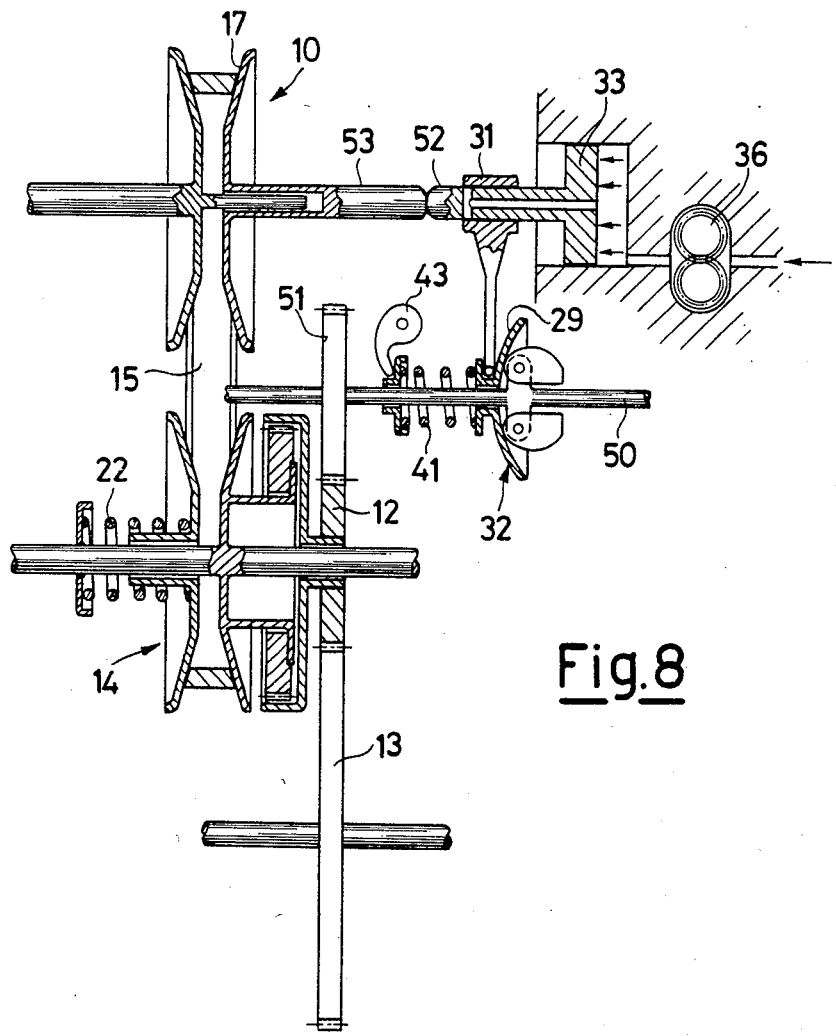
FIG. 8 is a diagram of a further embodiment of the transmission system according to the invention.

Thus the device according to the invention can assume the form shown in FIG. 8, in which elements corresponding to the embodiment of FIG. 2 are given the same reference numerals.

In this embodiment the regulator 32 is mounted on a shaft 50 which is again driven synchronously with the shaft of the driven pulley by the gear wheel 51 which engages with the gear wheel 12; the movement of the cap 29, the mobile regulator element, controls the hydraulic follower constituted by the piston 33, on the rod 52 of which there is mounted the bush 31 which uncovers the port 38. The rod 52 urges the rod 53, which is rigid with the half pulley 17, in order to close the pulley 10 and thus open the pulley 14 against the action of the spring 22. Thus, the action of the regulator 32 has the same effect on the driven pulley as the regulator 32 of the embodiment of FIG. 1 had in operating directly on the driven pulley. Numerous other embodiments are possible in obtaining the required effects within the inventive concept, by using, for the various known transmission components, components which are mechanically and functionally equivalent for the purpose of providing a transmission which operates in accordance with the aforesaid teachings, which have been expressed in detail for the sole purpose of generally clarifying the inventive principles.

I claim:

1. A transmission system for continuously varying the transmission ratio between a drive shaft and a driven shaft, comprising:
    (a) an operating element arranged to vary the transmission ratio;
    (b) a shank in communication with said driven shaft and mounted at one end to said operating element and at the other end to means for displacing said shank;
    (c) a speed sensor mounted on said shank for measuring the angular speed of said shank;
    (d) a bushing slidably mounted on said shank and means in communication with said speed sensor for exerting a force on the bushing; and
    (e) means for sensing the torque transmitted to said drive shaft and applying a force on a yieldable member whereupon said yieldable member provides force opposed to the force exerted on said bushing by said speed sensor so as to reposition said operating element to effect a transmission ratio change which maintains the rotational speed on said drive shaft substantially constant.

2. A system as claimed in claim 1, wherein said variable transmission comprises pulleys of variable winding diameters interconnected by a belt to effect a change in transmission ratio.

3. A system as claimed in claim 2, wherein said operating element is a half of one of said pulleys.

4. A system as claimed in claim 2, wherein said means for sensing the speed of said shank comprises centrifugal masses which react against a lever which is pre-loaded by said yieldable member for moving said operating element.

5. A system as in claim 4, wherein said lever moves said operating element by means of a servo-mechanism.

6. A system as claimed in claim 5, wherein said yieldable member is a spring.

7. A system as claimed in claim 6, wherein said means for sensing the torque transmitted to said drive shaft is a regulator for regulating said spring pre-loading.

8. A system as claimed in claim 6, wherein said spring has a substantially exponential elastic characteristic.

9. A system as claimed in claim 5 wherein said centrifugal masses act against said lever in opposition to said yieldable member which opposition increases as said centrifugal masses increasingly withdraw from the axis of rotation of said shank.

10. A system as claimed in claim 9, wherein the withdrawal of said centrifugal masses from the axis of rotation of said shank occurs against the force of said yieldable member which increases exponentially with the withdrawal of said centrifugal masses from the axis of said shank.

* * * * *